United States Patent [19]

Mitaki

[11] Patent Number: 5,753,833
[45] Date of Patent: May 19, 1998

[54] ELECTRONIC WATCH HAVING A WATER DEPTH MEASURING FUNCTION

[75] Inventor: Kazuya Mitaki, Tachikawa, Japan

[73] Assignee: Citizen Watch Co., Ltd., Tokyo, Japan

[21] Appl. No.: 883,802

[22] Filed: Jun. 27, 1997

Related U.S. Application Data

[63] Continuation of Ser. No. 654,711, May 29, 1996, abandoned.

[30] Foreign Application Priority Data

Jun. 2, 1995 [JP] Japan ................... 7-136401

[51] Int. Cl.$^6$ ........................................... G04B 47/06
[52] U.S. Cl. ........................... 73/865.1; 128/201.27; 340/626; 364/558
[58] Field of Search ......................... 73/714, 865.1, 73/299, 300, 301; 340/626; 128/201.27; 364/558

[56] References Cited

U.S. PATENT DOCUMENTS

| 4,188,825 | 2/1980  | Farrar ............................ 73/865.1 |
| 4,307,449 | 12/1981 | Strubin ........................... 73/865.1 |
| 4,658,358 | 4/1987  | Leach et al. ..................... 73/865.1 |
| 4,783,722 | 11/1988 | Umemoto et al. ................ 368/11 |
| 5,031,160 | 7/1991  | Koizumi et al. ................. 368/10 |
| 5,148,376 | 9/1992  | Sato .............................. 364/558 |
| 5,457,284 | 10/1995 | Ferguson ........................ 128/201.27 |
| 5,519,671 | 5/1996  | Murakami et al. ............... 368/10 |

FOREIGN PATENT DOCUMENTS

| 58-85185A  | 8/1983  | Japan . |
| 61-178688  | 8/1986  | Japan . |
| 62-153792A | 7/1987  | Japan . |
| 4276515    | 1/1992  | Japan . |
| 2 023 311  | 12/1979 | United Kingdom . |
| 2 089 075  | 6/1982  | United Kingdom . |

*Primary Examiner*—George M. Dombroske
*Attorney, Agent, or Firm*—Howell & Haferkamp, L.C.

[57] ABSTRACT

The present invention is aimed to propose a method for minimizing erroneous shift to a water depth measurement mode by judging whether shift to a water depth measurement mode is caused by normal operation or erroneous detection and for automatically getting out of the water depth measurement mode even in the case of erroneous shift to the water depth measurement mode. Instantaneous shift to a water depth measurement mode is prevented when the water depth judging circuit 5 judges that a water depth value Ddpt from the measurement arithmetic processing circuit exceeds a predetermined value and that the water detection switch 6 detects no water contact, and a time information display mode is automatically returned even in the case of erroneous shift to a water depth measurement mode. Instantaneous shift to a water depth measurement mode is prevented when the water detection switch is on under conditions other than diving, and an original mode is automatically returned by judging the situation precisely even in the case of unexpected shift to a water depth measurement mode.

25 Claims, 7 Drawing Sheets

ELECTRONIC WATCH HAVING A WATER DEPTH MEASURING FUNCTION

This application is a continuation of application Ser. No. 08/654,711 filed on May 29, 1996 now abandoned.

BACKGROUND OF THE INVENTION

1. Field of the Invention

This invention relates to an electronic watch having a water depth measuring function. More specifically, it relates to an operation technique for preventing erroneous detection in an electronic watch having a water depth measuring function.

2. Description of the Prior Art

Heretofore, there has been proposed an electronic watch having a water depth measuring function which comprises an external terminal electronically insulated from a casing and means for detecting water contact from electrical conduction between this terminal and the casing through water so as to automatically starts water depth measurement.

The applicant has proposed in WO94/20886 that measurement of a water depth of 0 m as a reference is made at intervals of a fixed time for water depth measurement, water depth measurement is started when water contact is detected with water contact detection means such as one described above, it is detected that a diver is under water when a water depth of more than 1 m is measured, and the operational ease of the diver is improved by shifting to an underwater measurement mode.

However, if this technique in which measurement of a water depth of 0 m as a reference is made at intervals of a fixed time for water depth measurement, that is, atmospheric pressure on the ground is measured at intervals of 5 minutes, an atmospheric pressure at that time is stored as a value for a water depth of 0 m, and water depth measurement is made based on this reference value for a water depth of 0 m when water contact is detected by the above water contact detection means is adopted in an electronic watch having a water depth measuring function, it is obvious that water depth measurement is based on pressure data obtained when the water depth is 0 m. Therefore, it is desirable that the accuracy of water depth measurement should be increased by measuring a water depth of 0 m as a reference right before diving and a water depth of 0 m should be measured as a reference in a very short period of time, which is disadvantageous in terms of power consumption. Meanwhile, when this interval is extended, for example, to 1 hour, the following problems are produced.

That is, although atmospheric pressure inside the airplane is adjusted during flight at an altitude of several thousands of meters above the ground when a user is on board the airplane, the difference of atmospheric pressure between the ground and the airplane is about 2,000 m in terms of altitude. Therefore, measurement of a water depth of 0 m as a reference is made in the sky. Before the next chance of measuring a water depth of 0 m as a reference after landing on the ground, water depth measurement is carried out by creating a wet state for the above water contact detection means by some operation such as perspiration or the like. At this point, when a predetermined water depth, for example, a water depth of more than 1 m, is measured from the difference of atmospheric pressure from the previous measurement value for a water depth of 0 m as a reference, it is erroneously detected that the diver dives under water. This results in display lock in an underwater measurement mode, restrictions imposed on functions, and an increase in power consumption caused by water depth measurement, which are fatal problems to an electronic watch having a water depth measuring function which uses a small battery as a main power source.

Because of the above restrictions, measurement of a water depth of 0 m as a reference is made every 5 to 10 minutes. However, it is impossible to completely eliminate erroneous shift to an underwater measurement mode due to an unexpectedly large change in atmospheric pressure. To return from the erroneously detected mode to the original mode, there has been proposed to forcedly operate the switch to return to the original mode. However, when the diver is unaware of this, the battery is used up in the worst case. When the original mode is returned by some means or other, the diver may be confused temporarily.

SUMMARY OF THE INVENTION

It is an object of the present invention to provide an electronic watch having a water depth measuring function, which eliminates the above defects, judges properly whether a water depth measurement mode is caused by proper operation or by erroneous detection, and is controlled such that it automatically gets out of a water depth measurement mode when it is caused by erroneous detection or it is not shifted to a water depth measurement mode.

To solve the above problems, the present invention provides an electronic watch having a water depth measuring function, which comprises water detection means for detecting contact with water or sea water, a timing circuit for generating a timing signal for measurement or the like, a pressure sensor, a water depth measurement circuit for measuring a water depth based on a water pressure detected by the pressure sensor, and water depth judging means for judging that the water depth exceeds a predetermined value, wherein the watch further comprises water detection switch count circuit for detecting that the water detection means generates an off signal for a predetermined time while the water depth judging means is supplied with a signal indicating that the water depth exceeds the predetermined value.

Further, even when the water depth exceeds a predetermined during water depth measurement at the time of the detection of water and when the water detection means generates an off signal a predetermined number of times for sampling at the time of the next water detection sampling, shift to water depth display is cancelled.

DETAILED DESCRIPTION OF THE PREFERRED EMBODIMENTS

The preferred embodiments of the present invention will be described in detail with reference to the accompanying drawings.

Figure 1:
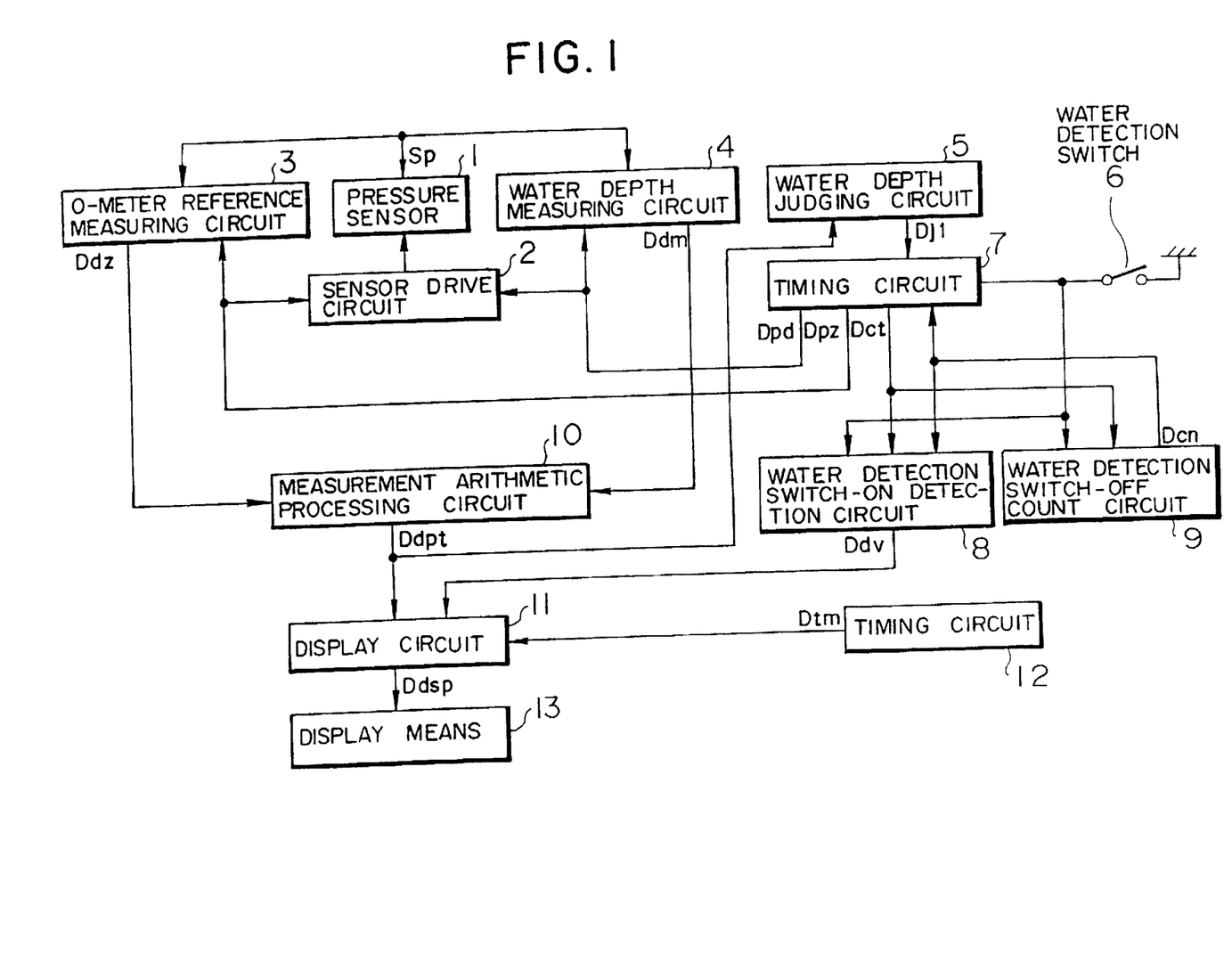
FIG. 1 is a block diagram of an electronic watch having a water depth measuring function according to a first embodiment of the present invention.

FIG. 1 is a block diagram of an electronic watch having a water depth measuring function according to a first embodiment of the present invention wherein malfunction of the electronic watch is systematically prevented.

In FIG. 1, reference numeral 1 represents a pressure sensor for outputting a pressure signal Sp which is in proportion to a pressure P, 2 a sensor drive circuit for driving the pressure sensor 1 by supplying a constant current, 3 a 0-meter reference measuring circuit for outputting a zero reference signal Ddz which is a 0-m reference value obtained by measuring an atmospheric pressure signal Sp on the surface of the water, 4 a water depth measuring circuit for outputting a water depth signal Ddm which is a water depth value obtained by measuring a water pressure signal Sp in the water, 5 a water depth judging circuit for outputting a water depth judging signal Dj1 when it detects a predetermined water depth, for example, 1 m or more, and 6 a water detection switch for detecting contact with water or sea water.

The timing circuit 7 outputs a zero reference measurement start signal Dpz which is a timing signal for measuring a 0-m reference value every 5 minutes when the water detection switch 6 is off (when the watch is not in contact with water or sea water). The timing circuit 7 also outputs a water depth measurement start signal Dpd which is a timing signal for measuring a water depth every 1 second when the water detection switch 6 is on (when the watch is in contact with water or sea water). Further, the timing circuit 7 supplies a water detection switch sampling signal Dct, which is provided every 1 second, to the water detection switch-on detection circuit 8 and the water detection switch-off count circuit 9 upon receipt of the water depth judging signal Dj1. Further, the timing circuit 7 cancels the output of the water depth measurement start signal Dpd and the water detection switch sampling signal Dct and starts outputting a zero reference measurement start signal Dpz every 5 minutes upon receipt of a cancel signal Dcn from the water detection switch-off count circuit 9 to. This timing circuit 7 corresponds to circuit operation control means in claims.

The water detection switch-on detection circuit 8 supplies to a display circuit 11 a water depth mode signal Ddv for switching display by the display circuit 11 to a water depth display value based on a water depth value Ddpt when the water detection switch 6 is on after it is supplied with a water detection switch sampling signal Dct from the timing circuit 7. The water detection switch-off count circuit 9 detects the on/off operations of the water detection switch 6 at a timing of a water detection switch sampling signal Dct from the timing circuit 7, counts the number of the off operations, and outputs a cancel signal Dcn for stopping the operations of the timing circuit 7 and a measurement arithmetic processing circuit 10 to terminate water depth measurement when it counts a predetermined number of times, for example, 256 times.

Reference numeral 10 represents a measurement arithmetic processing circuit for computing a water depth based on a zero reference signal Ddz from the 0-m reference measuring circuit 3 and a water depth signal Ddm from the water depth measuring circuit 4 and for outputting a water depth value Ddpt, 11 a display circuit for outputting a display signal Ddsp based on a time signal Dtm from a timing circuit 12 and a display signal Ddsp based on the water depth value Ddpt upon receipt of a water depth mode signal Ddv, 12 a timing circuit for counting time and outputting a timing signal Dtm, and 13 display means for displaying based on the display signal Ddsp.

The electronic watch having a water depth measuring function which has the above circuit configuration operates as follows.

Figure 2A:
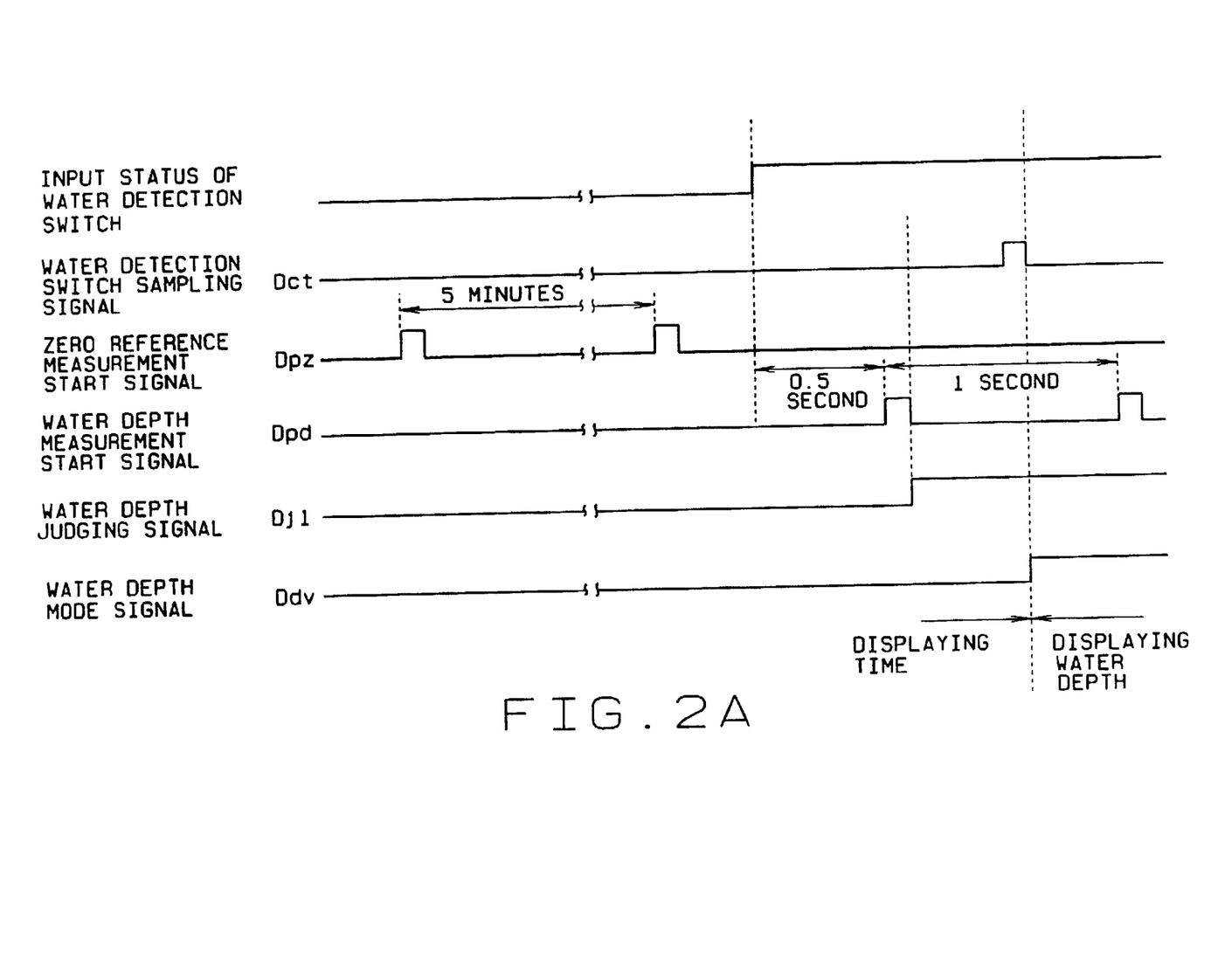
FIG. 2A is a timing chart explaining the operation of the first embodiment of FIG. 1.

The timing circuit 7 monitors the input state of the water detection switch 6 and supplies a zero reference measurement start signal Dpz to the sensor drive circuit 2 and the 0-m reference measuring circuit 3 every 5 minutes as shown in the timing chart of FIG. 2A when the water detection switch 6 is off, that is, a diver is above water. Thereby, the pressure sensor 1 supplies a pressure signal Sp based on atmospheric pressure to the 0-m reference measuring circuit 3 which in turn amplifies the pressure signal Sp, changes it into a numerical value and supplies a zero reference signal Ddz to the measurement arithmetic processing circuit 10. The measurement arithmetic processing circuit 10 stores this zero reference signal Ddz as a reference value for a water depth of 0 m.

Now, when the diver on an airplane or the like touches the water detection switch 6 with his sweaty hand or the like at the time of a more than 1,000 m descent of the airplane while reference measurement of a water depth of 0 m is carried out every 5 minutes as shown in FIG. 2, the measurement arithmetic processing circuit 10 supplies a water depth value Ddpt of more than 1 m to the water depth judging circuit 5 after a predetermined time (0.5 second in FIG. 2) as described above. As the result, the water depth judging signal Dj1 is supplied to the timing circuit 7. After 0.5 second, the water detection switch sample signal Dct is output from the timing circuit 7 and the water detection switch-on detection circuit 8 checks the input state of the water detection switch 6. When the the water detection switch 6 is off, the water detection switch-on detection circuit 7 does not output a water depth mode signal Ddv. Since the display circuit 11 selects a time signal Dtm, the display means 13 continues to display time. (When the water detection switch-on detection circuit 8 detects that the input state of the water detection switch 6 is on, it outputs a water depth mode signal Ddv, thereby the display circuit 11 selects a water depth value Ddpt, and the display means 13 displays a water depth value.) The water detection switch-off count circuit 9 begins to count the off state of the water detection switch 6. Even if the mode is shifted to a water depth measurement mode by mistake, as the water detection switch 6 remains off when the diver is not under water, the water detection switch-off count circuit 9 continues to count the off state of the water detection switch 6. When the water detection switch-off count circuit 9 counts the off state of the water detection switch 6 a predetermined number of times, for example, 256 times, it outputs a cancel signal Dcn to the timing circuit 7. Then the timing circuit 7 stops the output of a water depth measurement start signal Dpd and a water detection switch sampling signal Dct. The water depth measurement operation is thereby cancelled and the water detection switch-on detection circuit 8 is reset. As the result, the water detection switch-on detection circuit 8 stops the output of a water depth mode signal Ddv and switches the display signal Ddsp of the display circuit 11 to a time signal Dtm and returns it to a time display mode.

As described above, in this embodiment, when the water detection switch-on detection circuit 8 counts the on state of the water detection switch 6 once, the mode is shifted to a water depth measurement mode. This increases the chances of shifting to the water depth measurement mode by mistake. To prevent this, the number of times of counting by the water detection switch-on detection circuit 8 should be increased to two or three. However, in this case, shift to a water depth measurement mode takes several seconds in normal operation when the diver goes under water, which deteriorates the ease of use. When the number of times of counting by the water detection switch-on detection circuit 8 is one, the mode can be shifted to a water depth measurement mode with a delay of only 0.5 second.

In other words, referring to FIG. 2A, upon detection of water by the water detection switch 6, the timing circuit 7 outputs every second the signal Dpd, which drives the sensor drive circuit 2 and other circuits. The measurement arithmetic processing circuit 10, upon receipt of the output Ddm of the water depth measuring circuit 4, outputs the water depth value Ddpt to the water depth judging circuit 5. The water depth judging circuit 5 outputs the water value over 1 meter. The timing circuit 7 outputs the water detection switch sampling signal Dct (0.5 second later in the embodiment). At this moment, if the water detection switch 6 is "on," the water detection switch-on detection circuit 8 will output the water depth mode signal Ddv, so that the display means 13 will change to water depth mode.

Figure 2B:
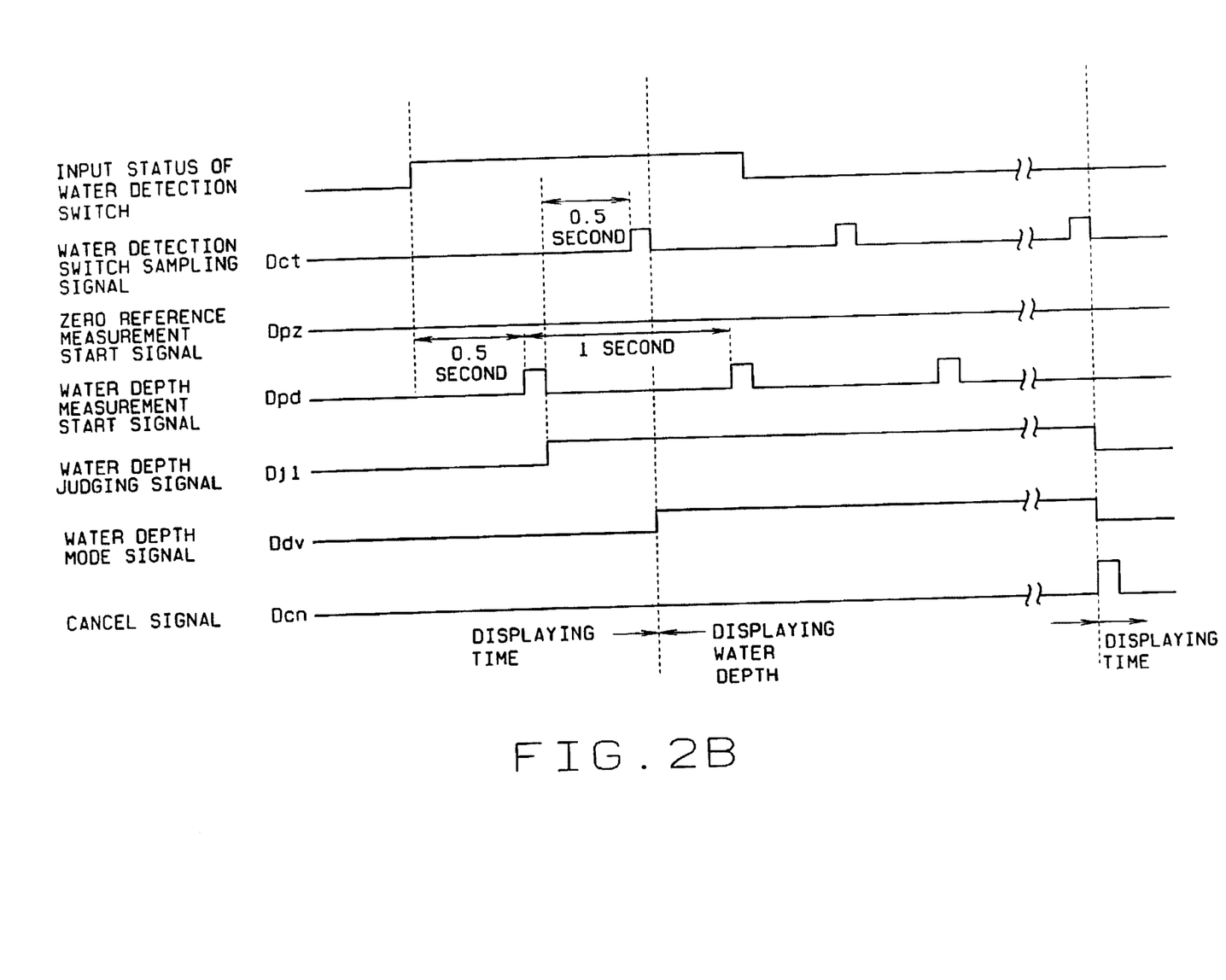
FIG. 2B is a timing chart explaining the operation of the water measurement device when the water measurement starts in error.

FIG. 2B illustrates a case where, even if the water measurement starts in error, upon detection of the "off" state of the water detection switch 6 at the time when the water detection switch sampling signal Dct is output, the water depth mode is not entered. Operation of the circuit is the same as that shown in FIG. 2A until the time when the water detection switch 6 detects water with the result that the water depth measurement start signal Dpd is output and then the water depth judging signal Dj1 is output. However, in case the water detection switch 6 turns off instantly as shown in FIG. 2B, the "off" state of the water detection switch 6 is detected at the time when the water detection switch sampling signal Dct appears, so that the water depth mode signal Ddv is not output.

Figure 2C:
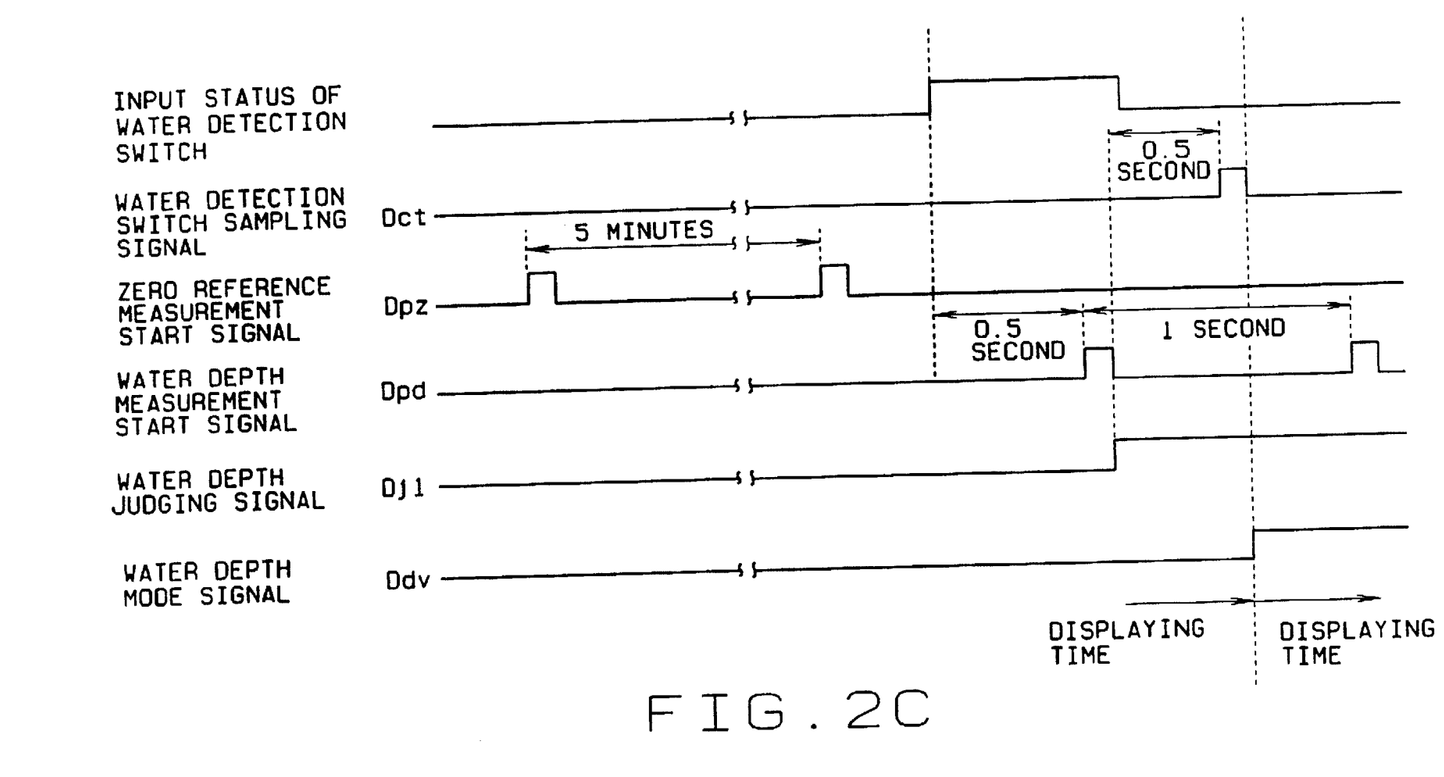
FIG. 2C is a timing chart explaining the operation of the water measurement device when the water detection switch detects water.

FIG. 2C shows another timing situation in which operation of the circuit is the same as that shown in FIG. 2A until the time when the water detection switch 6 detects water with the result that the water depth measurement start signal Dpd is output and then the water depth judging signal Dj1 is output. The former half of FIG. 2A is omitted. In the operation of FIG. 2C, even if the water depth mode signal Ddv is output and the display means changes to water depth display mode, the state of the water detection switch 6 is checked at the time when the water detection switch sampling signal Dct is output, and upon completion of counting of the "off" state 256 times, the water detection switch-off count circuit 9 will output measurement start signal Dpd and the water detection switch sampling signal Dct stops their output and will return to a time display mode.

Figure 3:
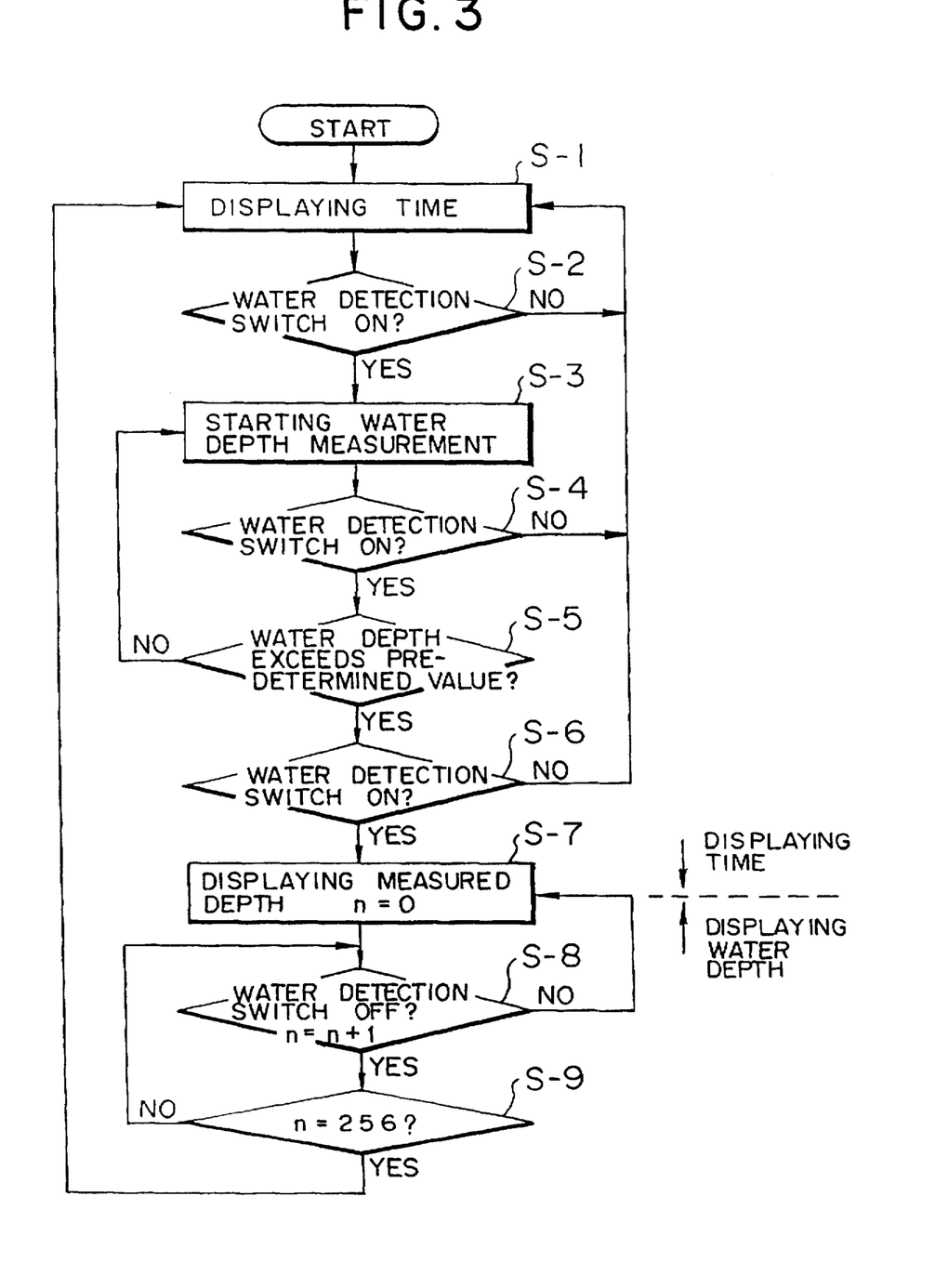
FIG. 3 is a flow chart explaining the operation of the first embodiment of FIG. 1.

FIG. 3 is a flow chart explaining the operation of the first embodiment shown in FIG. 1.

When the electronic watch having a water depth measuring function is above water, the display means 13 displays time (S-1). At this point, the timing circuit 7 checks the state of the water detection switch 6 (S-2). When it is on, the timing circuit 7 outputs a water depth measurement start signal Dpd to start water depth measurement (S-3). The timing circuit 7 further checks the state of the water detection switch 6 (S-4). When it is off, the timing circuit 7 stops the output of a water depth measurement start signal Dpd and a time display mode returns (S-1). In the checking step (S-4), when the water detection switch 6 is on, the timing circuit 7 checks if a water depth judging signal Dj1 is output from the water depth judging circuit 5, that is, the water depth exceeds a predetermined value (S-5). When the water depth judging signal Dj1 is output, the timing circuit 7 supplies a water detection switch sampling signal Dct to the water detection switch-on detection circuit 8 and the water detection switch-off count circuit 9. The water detection switch-on detection circuit 8 checks the state of the water detection switch 6 at a timing of the water detection switch sampling signal Dct (S-6). When the state is on, the water detection switch-on detection circuit 8 outputs a water depth mode signal Ddv, changes the display of the display means 13 to water depth measurement display and brings the electronic watch having a water depth measuring function into a water depth measurement mode (S-7). When the state of the water detection switch 6 is off in the checking step (S-6), the output of a water depth start signal Dpd is stopped and a time display mode returns (S-1). In step (S-7) and subsequent steps, the water detection switch-off count circuit 9 checks the state of the water detection switch 6 regularly at a timing of a water detection switch sampling signal Dct. When the state of the water detection switch 6 is off, the circuit counts the number of times of checking the off state of the water detection switch 6 (S-8). When the count number reaches 256 (S-9), the water detection switch-off count circuit 9 outputs a cancel signal Dcn and as the result, the output of a water depth mode signal Ddv from the water detection switch-on detection circuit 8 and the output of a water depth measurement start signal Dpd from the timing circuit 7 are stopped and a time display mode returns (S-1).

As described above, in this embodiment, even when the water detection switch 6 detects by mistake water contact caused by perspiration and further when the mode is shifted to a water depth measurement mode by the water depth judging circuit 5 which detects a water depth value above a predetermined value which is caused by a drastic change in atmospheric pressure due to nose diving of the airplane, the electronic watch is controlled such that the state of the water detection switch 6 is detected and the mode returns to a time mode when the state of the water detection switch 6 remains off for a predetermined time. Therefore, even if the mode is shifted to a water depth measurement mode by mistake, it is possible to eliminate waste of power consumption and prevents a user from being confused. Further, if the state of the water detection switch 6 is detected to be off right after the detection of a water depth value above a predetermined value, shift to a water depth measurement mode is eliminated. Therefore, shift to a water depth measurement mode caused by erroneous input by the water detection switch 6 can be prevented. Moreover, since the mode is shifted to a water depth measurement mode with only one time of counting the on state by the water detection switch-on detection circuit 8, a swift mode change is possible even when the watch is used in actual diving.

As a consequence, when the user actually dives under water, he/she can use a water depth measuring function without a sense of incompatibility and further can inhibit shift to a water depth measurement mode in the case of the instantaneous erroneous detection of the water detection switch 6. Also, in the case of erroneous shift to a water depth measurement mode, the watch automatically returns a time display mode without a special operation by the diver.

Figure 4:
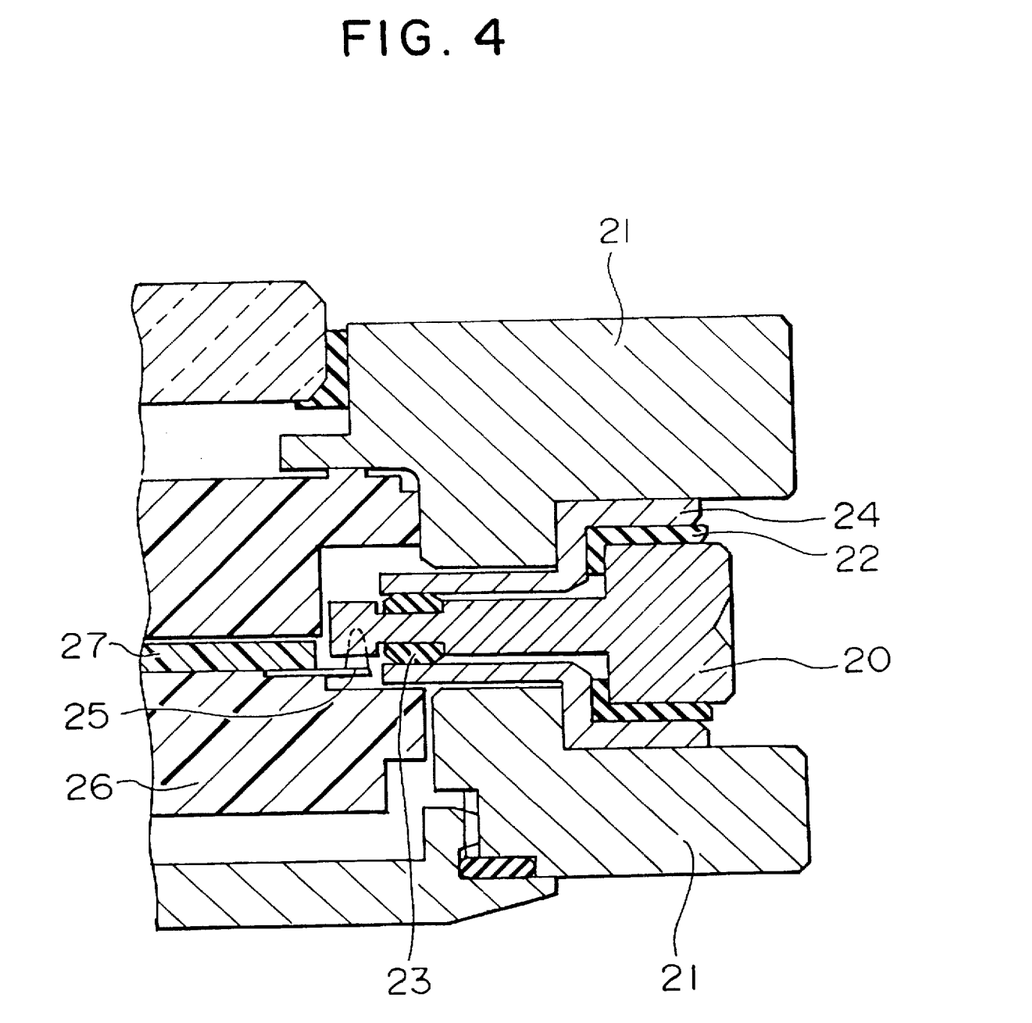
FIG. 4 is a sectional view of an electronic watch having a water depth measuring function according to a second embodiment of the present invention.

FIG. 4 is a sectional view of an electronic watch having a water depth measuring function according to a second embodiment of the present invention wherein malfunction of the electronic watch is prevented by a structural means.

In FIG. 4, reference numeral 20 represents a water detection terminal which is electrically insulated from a casing 21 connected to a voltage level VDD by packings 22 and 23, installed in a side pipe 24 on the side surfaces of the casing 21, and normally pulled down to a voltage level VSS through an unshown pull-down resistor. Reference numeral 25 denotes a contact spring which is electrically connected to a circuit board 27 of a module 26 of the electronic watch having a water depth measuring function. When the contact spring 25 is press contacted with the water detection terminal 20, the water detection terminal 20 and an unshown water detection circuit on the circuit board 27 are electrically connected. The water detection terminal 20 and the casing 21 are electric conductive through water to detect water contact.

In this embodiment, as shown in FIG. 4, the casing 21 is deeply recessed to contain the water detection terminal 20. Owing to such configuration, even if a user's hand touches a portion near the water detection terminal 20, the water detection terminal 20 is guarded by the casing 21 so that the user cannot touch it. As the result, there is no chance for the user to touch both the water detection terminal 20 and the casing 21 by hand at the same time and as the result, the water detection terminal 20 and the casing 21 are not electrically conductive under conditions other than diving. This makes it possible to prevent erroneous operation of water detection. Further, since the water detection terminal 20 and the casing 21 are electrically conductive through water or sea water when the user actually dives under water, the watch can detect water contact and operates properly.

Figure 5:
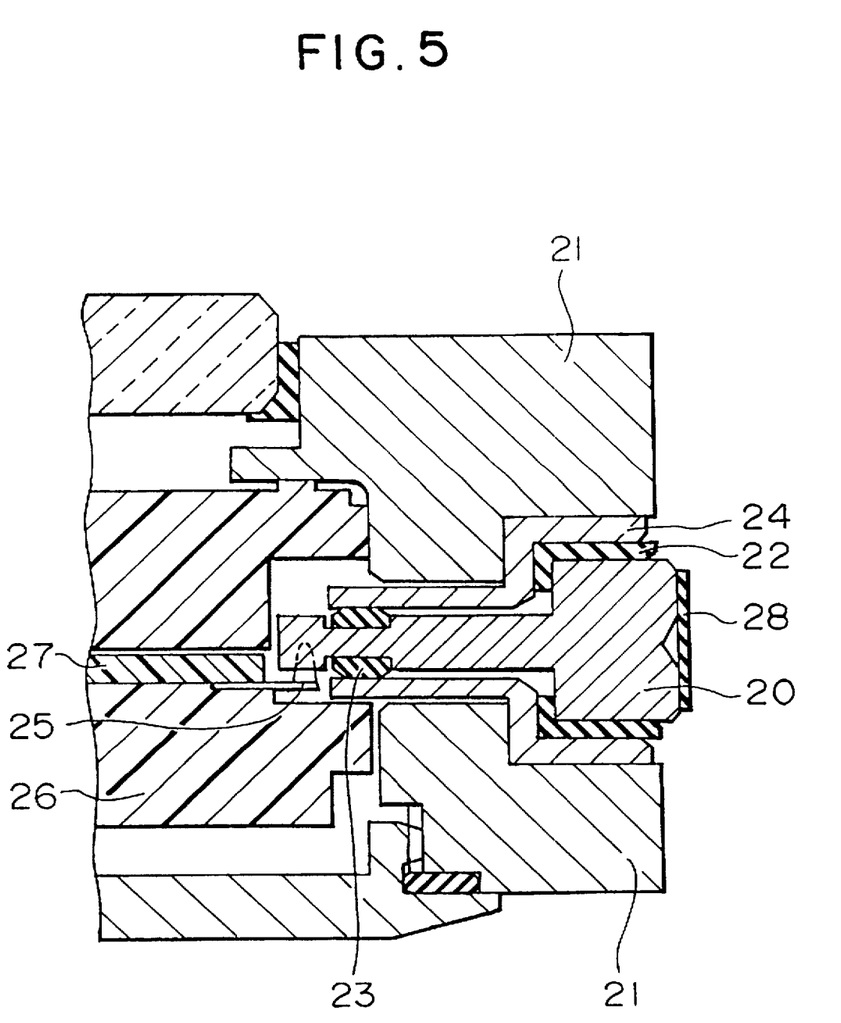
FIG. 5 is a sectional view of an electronic watch having a water depth measuring function according to a third embodiment of the present invention.

FIG. 5 is a sectional view of an electronic watch having a water depth measuring function according to a third embodiment of the present invention wherein malfunction of the electronic watch is prevented by a structural means. This embodiment is recited in claim 11. In FIG. 5, the same elements are given the same reference numerals as those of FIG. 4 and their descriptions are omitted.

In this embodiment, as shown in FIG. 5, an insulating member 28 is attached to the surface of the water detection terminal 20. With such constitution, even if a user's hand may touch a portion near the water detection terminal 20, the water detection terminal 20 is covered with the insulating member 28 so that the user cannot touch the water detection terminal 20. Therefore, there is no chance for the user to touch both the water detection terminal 20 and the casing 21 by hand at the same time, and as the result, the water detection terminal 20 and the casing 21 are not electrically conductive under conditions other than diving. This makes it possible to prevent the erroneous operation of water detection. Further, since the water detection terminal 20 and the casing 21 are electrically conductive through water or sea water when the user actually dives under water, the watch can detect water contact and operates properly.

What is claimed is:

1. An electronic watch having a water depth measuring function, comprising time signal generation means for generating a time signal, a pressure sensor, a sensor drive circuit for driving said pressure sensor, a water depth measuring circuit for outputting a water depth signal based on the output of said pressure sensor, water depth measurement arithmetic means for generating a water depth value based on the water depth signal, display means for displaying at least one of the time signal and the water depth value, and water detection means for detecting water contact and outputting a water detection signal, wherein the electronic watch further comprises malfunction prevention means for preventing the malfunction of said water detection means.

2. An electronic watch having a water depth measuring function according to claim 1, wherein said malfunction prevention means is systematic malfunction prevention means.

3. An electronic watch having a water depth measuring function according to claim 2 which further comprises circuit operation control means for outputting an operation signal to said water depth measuring circuit upon receipt of the water detection signal from said water detection means and stopping the output of the operation signal when no water detection signal is supplied from said water detection means after the output of the operation signal.

4. An electronic watch having a water depth measuring function according to claim 3, further comprising a water depth judging circuit for outputting a water depth judging signal when the water depth value exceeds a predetermined value is provided, and a water detection switch detection circuit for outputting a water depth mode signal upon receipt of the water detection sample signal and the water detection signal, wherein said circuit operation control means outputs a water detection sample signal upon receipt of the water depth judging signal.

5. An electronic watch having a water depth measuring function according to claim 4, further comprising a water detection switch-off count circuit for outputting a cancel signal when the absence of the water detection signal is detected during a predetermined time after receipt of the water depth judging signal wherein said water detection switch detection circuit and said circuit operation control means are initialized by the cancel signal.

6. An electronic watch having a water depth measuring function according to claim 5, wherein said display means displays the water depth value when the water depth mode signal is output.

7. An electronic watch having a water depth measuring function according to claim 6, wherein said water depth measurement arithmetic circuit has a reference measuring circuit for measuring a reference value to compute a water depth value, and the operation of said reference measuring circuit is controlled by said circuit operation control means at intervals of a predetermined time.

8. An electronic watch having a water depth measuring function according to claim 7, wherein said circuit operation control means operates said reference measuring circuit when the water detection signal is not output.

9. An electronic watch having a water depth measuring function according to claim 1, wherein said malfunction prevention means is structural malfunction prevention means.

10. An electronic watch having a water depth measuring function according to claim 9, wherein said water detection means has a water detection terminal, and said malfunction prevention means is deeply recessed to contain said water detection terminal.

11. An electronic watch having a water depth measuring function according to claim 9, wherein said water detection means has a water detection terminal, and said malfunction prevention means is an insulating member attached to said water detection terminal.

12. In an electronic watch having a water depth measurement function, the watch including a reference, a terminal normally electrically isolated from the reference, and a circuit for detecting an electrical connection between the reference and the terminal to thereby detect when the watch is wet, the watch being configured to prevent an object, including the watch user, from inadvertently creating an electrical connection between the reference and the terminal.

13. The electronic watch of claim 12 further including a casing, said casing comprising the reference.

14. The electronic watch of claim 13 wherein the terminal is recessed below an outer surface of the casing.

15. The electronic watch of claim 13 wherein a portion of the terminal is insulated to prevent the object from inadvertently creating an electrical connection between the casing and the insulated portion of the terminal.

16. The electronic watch of claim 15 wherein a portion of the terminal protrudes beyond an outer surface of the casing, the protruding portion comprising, at least in part, the insulated portion of the terminal.

17. In an electronic watch having a water depth measurement function, the watch operating in one of at least a first display mode and a second display mode, the second display mode corresponding to a water depth display mode, the watch including a water detector, a depth sensor, and a circuit for driving said depth sensor when said water detector detects water, said circuit determining whether the water depth sensed by the depth sensor exceeds a predetermined value, said circuit being configured to switch said watch from the first display mode into the second display mode only if the water detector detects water after the circuit determines the sensed water depth exceeds the predetermined value.

18. The electronic watch of claim 17 wherein said circuit is configured to determine whether the sensed water depth exceeds the predetermined value only if the water detector detects water after the sensed water depth is obtained.

19. The electronic watch of claim 17 wherein said circuit is configured to switch said watch from the first display mode into the second display mode only if the water detector detects water for a predetermined amount of time after the circuit determines the sensed water depth exceeds the predetermined value.

20. An electronic watch having a water depth measurement function, the watch operating in one of at least a first display mode and a second display mode, the second display mode corresponding to a water depth display mode, the watch including a control circuit for controlling said watch, said control circuit being configured for automatically switching said watch from the second display mode into the first display mode when said water detector fails to detect water after said watch enters the second display mode.

21. The electronic watch of claim 20 wherein said control circuit is configured for automatically switching said watch from the second display mode into the first display mode when said water detector fails to detect water for a predetermined amount of time after said watch enters the second display mode.

22. The electronic watch of claim 21 wherein said control circuit includes a count circuit for counting the number of times said water detector fails to detect water after said watch enters the water depth display mode.

23. The electronic watch of claim 22 wherein said control circuit provides a sampling signal to said count circuit, said sampling signal controlling a rate at which said count circuit samples said water detector.

24. The electronic watch of claim 23 wherein said count circuit is configured to assert a cancel signal when said counted number exceeds a predetermined value, said asserted cancel signal resetting said control circuit.

25. The electronic watch of claim 24 wherein said first display mode corresponds to a time display mode.

\* \* \* \* \*